United States Patent
Kawai

(10) Patent No.: US 7,961,361 B2
(45) Date of Patent: Jun. 14, 2011

(54) IMAGE READING APPARATUS, IMAGE READING METHOD AND IMAGE READING PROGRAM

(75) Inventor: Koji Kawai, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 925 days.

(21) Appl. No.: 11/865,276

(22) Filed: Oct. 1, 2007

(65) Prior Publication Data
US 2009/0086279 A1 Apr. 2, 2009

(51) Int. Cl.
*H04N 1/40* (2006.01)
*H04N 1/04* (2006.01)
(52) U.S. Cl. .................. 358/474; 358/461; 358/448
(58) Field of Classification Search .............. 358/474, 358/475, 465, 446, 447, 461, 448
See application file for complete search history.

(56) References Cited

U.S. PATENT DOCUMENTS

| | | | | |
|---|---|---|---|---|
| 4,806,780 A | * | 2/1989 | Yamamoto et al. | 348/251 |
| 5,943,141 A | * | 8/1999 | Tamura | 358/461 |
| 5,970,181 A | * | 10/1999 | Ohtsu | 382/274 |
| 2002/0054399 A1 | * | 5/2002 | Okamura | 358/529 |
| 2006/0061830 A1 | * | 3/2006 | Sakakibara | 358/448 |
| 2006/0245015 A1 | * | 11/2006 | Ikeno et al. | 358/518 |

FOREIGN PATENT DOCUMENTS

JP 2003-169190 6/2003

* cited by examiner

*Primary Examiner* — Jerome Grant, II
(74) *Attorney, Agent, or Firm* — Turocy & Watson, LLP

(57) ABSTRACT

An image reading apparatus in which cross-talk noise occurring between plural reading units is reduced, an image reading method and an image reading program are provided. There are included plural reading units that respectively operates at different timings, a reference data generation unit that acquires first read data as a result of reading of a first read object, acquires an operation state of the plural reading units during the reading of the first reading object, generates reference data based on the first read data, associates the operation state with the reference data obtained in the operation state and stores them, and a correction unit that acquires second read data as a result of reading of a second read object, acquires an operation state of the plural reading units during the reading of the second read object, acquires the reference data corresponding to the operation state, and corrects the second read data based on the reference data.

17 Claims, 18 Drawing Sheets

FIG.5
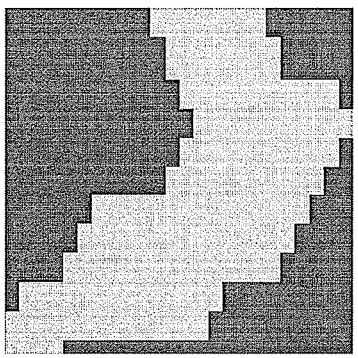
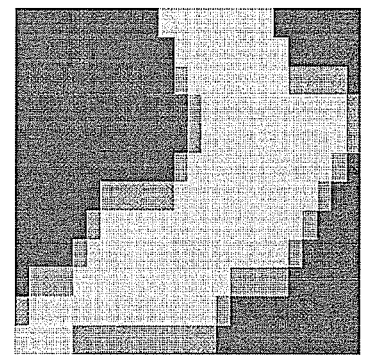
IMAGE A
IMAGE B
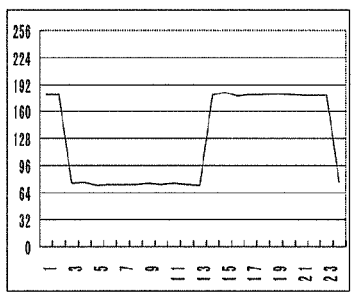
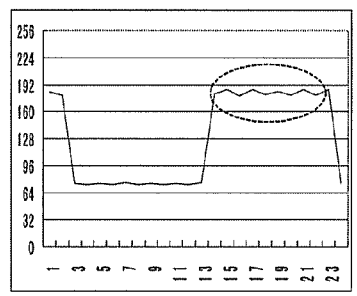
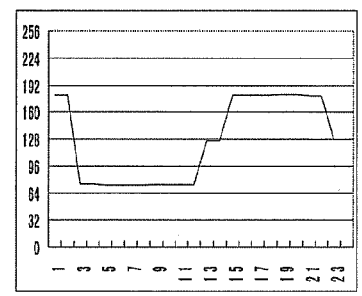
PROFILE OF ORIGINAL DOCUMENT IMAGE IN SUB-SCANNING DIRECTION
PROFILE OF IMAGE A IN SUB-SCANNING DIRECTION
PROFILE OF IMAGE B IN SUB-SCANNING DIRECTION FIG.6
IMAGE OF
WHITE REFERENCE DATA
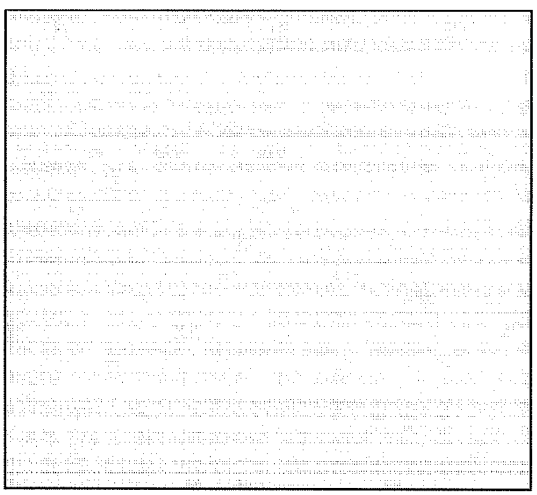
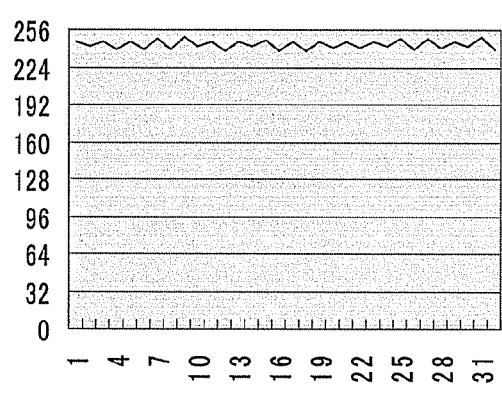
PROFILE OF WHITE REFERENCE
DATA IN SUB-SCANNING DIRECTION
IMAGE OF
BLACK REFERENCE DATA
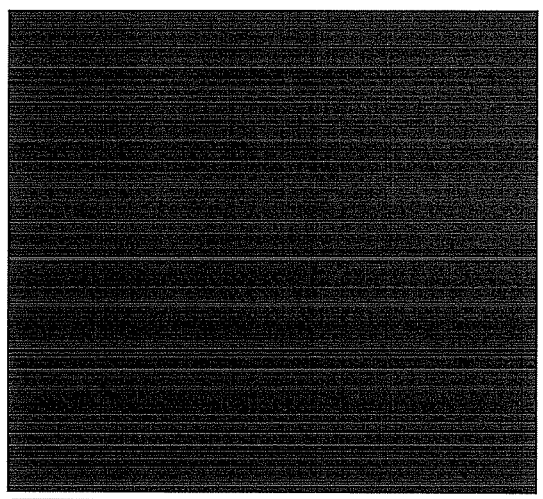
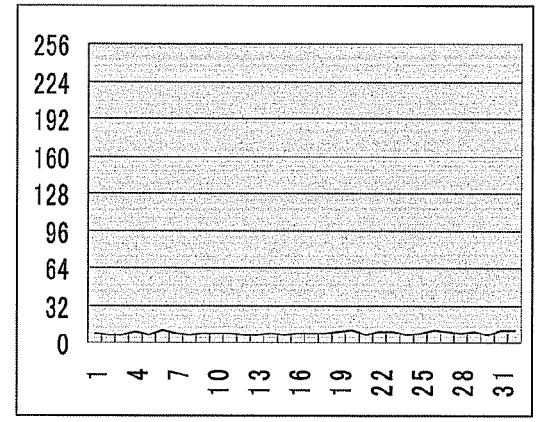
PROFILE OF BLACK REFERENCE
DATA IN SUB-SCANNING DIRECTION FIG.7
IMAGE BEFORE SHADING
CORRECTION PROCESSING
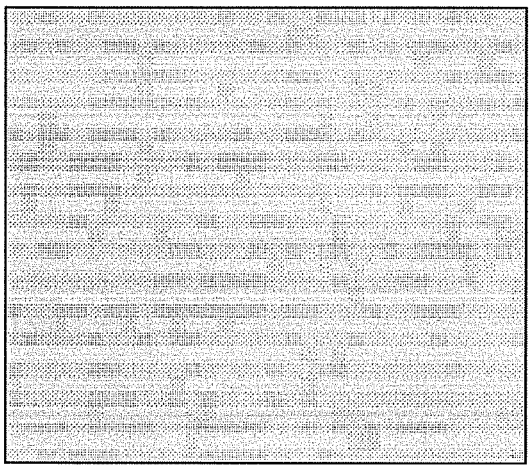
IMAGE AFTER SHADING
CORRECTION PROCESSING
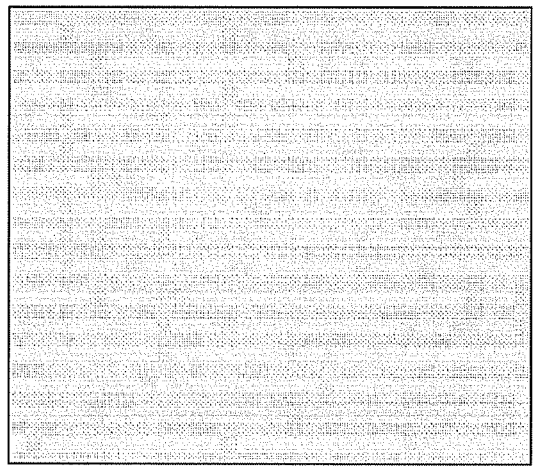
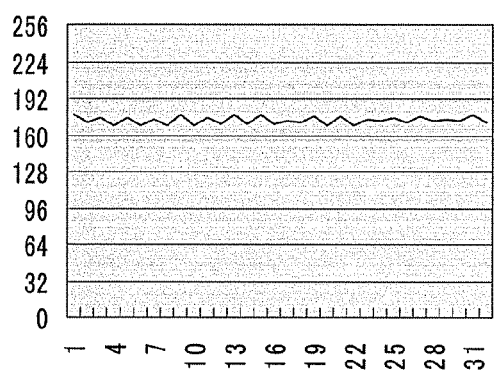
PROFILE IN SUB-SCANNING DIRECTION
BEFORE SHADING CORRECTION
PROCESSING
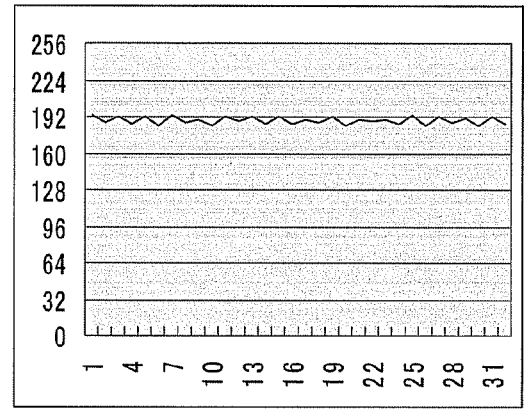
PROFILE IN SUB-SCANNING DIRECTION
AFTER SHADING CORRECTION
PROCESSING

FIG.13
IMAGE AFTER SHADING CORRECTION PROCESSING
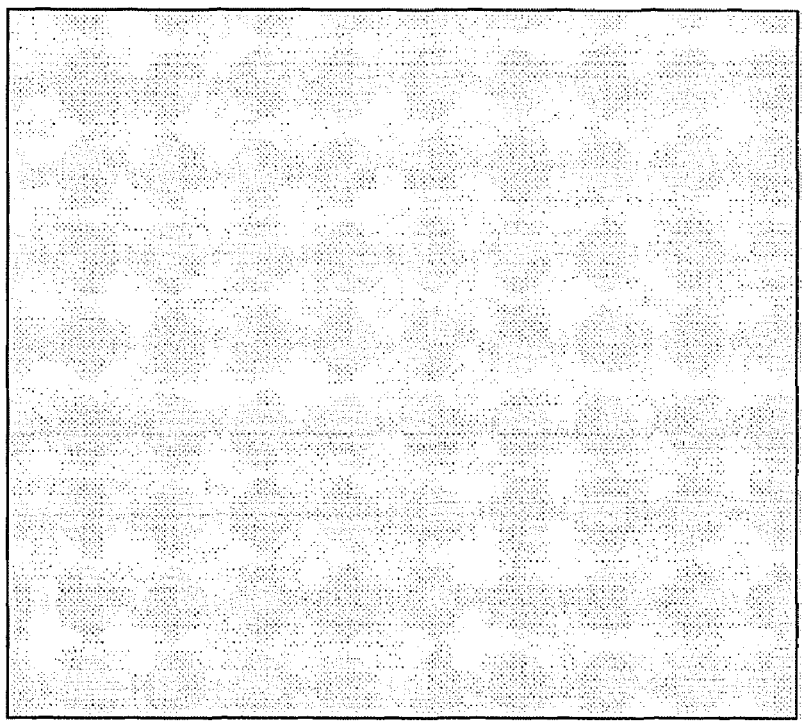
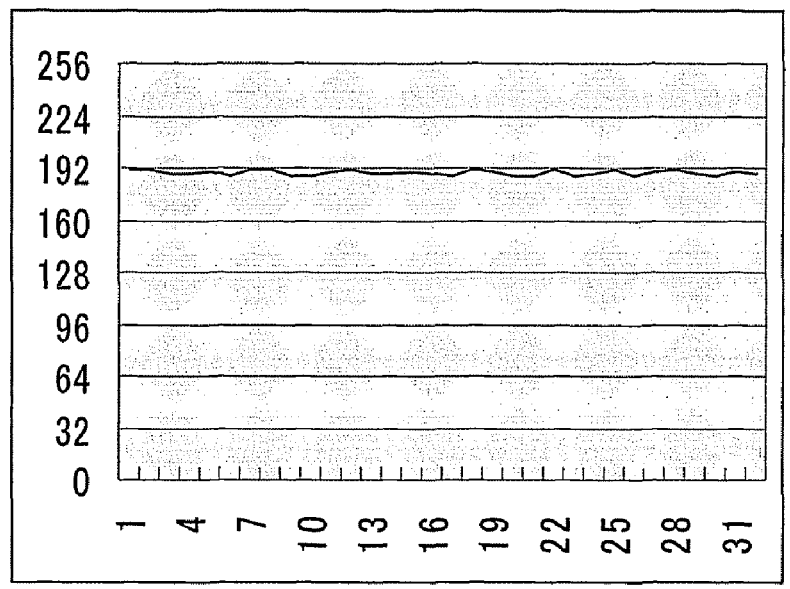
PROFILE IN SUB-SCANNING DIRECTION AFTER SHADING CORRECTION PROCESSING

IMAGE READING APPARATUS, IMAGE READING METHOD AND IMAGE READING PROGRAM

BACKGROUND OF THE INVENTION

1. Field of the Invention

The present invention relates to an image reading apparatus in which a read result is corrected, an image reading method and an image reading program.

2. Description of the Related Art

First, a structure of a mechanical system of a related art image reading apparatus will be described.

FIG. 14 is a block diagram showing an example of the structure of the mechanical system of the related art image reading apparatus. The mechanical system of the image reading apparatus includes a first carriage 2, a second carriage 3, a condensing lens 4, a one-dimensional image sensor device 5, an original document table glass 6, a platen cover 7, an illumination device 8, and mirrors 9, 10 and 11.

An original document is placed on the original document table glass 6 so that the original document writing surface faces the original document table glass 6 side, and the platen cover 7 is closed so that the original document is pressed to the original document table glass 6. When the original document is irradiated by lighting of the illumination device 8, reflected light from the original document is focused on the one-dimensional image sensor device 5 through the mirrors 9, 10 and 11 and the condensing lens 4.

The first carriage 2 including the illumination device 8 and the mirror 9 and the second carriage 3 including the mirrors 10 and 11 are moved by a not-shown carriage drive motor in synchronization with a read timing signal, so that sub-scanning of the original document is performed.

With respect to the original document, a pixel line is outputted at each read timing signal by the one-dimensional image sensor device 5 so that main scanning is performed, and the first carriage 2 and the second carriage 3 are moved so that the sub-scanning is performed. The intensity of the reflected light during the scanning is photoelectric converted by the one-dimensional image sensor device 5, and is outputted as an analog electric signal.

First, a structure of an electrical system of the related art image reading apparatus will be described.

FIG. 15 is a block diagram showing an example of the structure of the electrical system of the related art image reading apparatus. In this drawing, the same reference numeral as that of FIG. 14 denotes the same or equivalent part to that shown in FIG. 14, and its description will be omitted here. The electrical system of the image reading apparatus includes a one-dimensional image sensor device 5, an illumination device 8, an analog processing circuit 12, an A/D converter 13, a shading correction circuit 14, a page memory 15, an image processing circuit 16, a timing generation circuit 17, a CPU (Central Processing Unit) 18, a control panel 19, a memory 20, a mechanical system drive circuit 21, an illumination device control circuit 22, and an external interface circuit 23. The external interface circuit 23 is connected to an external apparatus.

The external apparatus is, for example, a storage apparatus such as a hard disk, a flash memory or an optical disk apparatus, a PC (Personal Computer), a printer or the like. Incidentally, the foregoing storage apparatus may be incorporated in the image reading apparatus.

The control panel 19 receives setting information from a user, and sends it to the CPU 18. The mechanical system drive circuit 21 is for driving the mechanism for sub-scanning, such as the first carriage 2 and the second carriage 3. The illumination device control circuit 22 controls the turning on and off of the illumination device 8.

The CPU 18 uses the memory 20 as a working memory, and operates in accordance with a program and data stored in the memory 20. Besides, the CPU 18 controls the timing generation circuit 17, the control panel 19, the mechanical system drive circuit 21, the illumination device control circuit 22, the shading correction circuit 14, and the external interface circuit 23. In accordance with instructions from the CPU 18, the timing generation circuit 19 sends timing signals, such as read timing signals, to the one-dimensional image sensor device 5, the analog processing circuit 12, the A/D converter 13, the shading correction circuit 14, and the page memory 15, and causes the respective parts to perform synchronous operations.

An analog electric signal as an image obtained by the one-dimensional image sensor device 5 is inputted to the analog processing circuit 12, and a pre-processing of A/D conversion is performed. Here, the analog processing circuit 12 includes a circuit to perform the pre-processing such as CDS (Correlated Double Sampling) or sample hold, analog electric signal amplification, or offset removal. The analog electric signal pre-processed by the analog processing circuit 12 is converted into a digital electric signal by the A/D converter 13, and is sent to the shading correction circuit 14.

The shading correction circuit 14 performs a shading correction processing on the digital electric signal to correct sensitivity variation between each main-scanning pixel in the one-dimensional image sensor device 5, uneven illumination of the illumination device 8 (especially in the main scanning direction) or the like, and stores the result thereof as correction data into the page memory 15. The shading correction circuit 14 may send the correction data directly to the image processing circuit 16.

The image processing circuit 16 performs an image processing according to an instruction received from the external interface circuit 23 on the correction data read out from the page memory 15, and sends output data as the result of the processing to the external apparatus through the external interface circuit 23. For example, in the case where the image reading apparatus is an image scanner, the image processing circuit 16 outputs the output data which the external PC or printer can use. Besides, for example, in the case where the image reading apparatus 1 is mounted in a copier, the image processing circuit 16 outputs the output data for driving an optical system so as to form a latent image on a photoconductive drum. The external interface circuit 23 receives the instruction of reading from the external apparatus, sends it to the image processing device 16, and sends the output data from the image processing device 16 to the external apparatus.

Next, the outline of an operation of image reading processing by the related art image reading apparatus will be described.

First, in the control panel 19, setting information is inputted by the user. The setting information is the setting of, for example, an operation mode (color mode, monochrome mode, etc.) in reading of an image, a reading resolution, a document size or the like. The setting information inputted to the control panel 19 is acquired by the CPU 18. The CPU 18 sends control signals to the respective parts based on the setting information. Next, when an image reading start instruction (start button) is inputted in the control panel 19, the CPU 18 starts the image reading processing.

FIG. 16 is a flowchart showing an example of the operation of the related art image reading processing. First, before reading of an original document image, the image reading apparatus performs a shading correction preparation processing to acquire reference data (black reference data and white reference data) used for a shading correction processing (S111 to S114). Here, a reading position (the first carriage 2) exists at an initial position. First, the CPU 18 turns off the illumination device 8 (S111). Next, the CPU 18 instructs the mechanical system drive circuit 21 to move the reading position from the initial position to a position just below a reference plate (first reading object), causes the one-dimensional image sensor device 5 to read the reference plate in the turning-off state, acquires the read data for plural lines in the state where the reflectivity is close to 0 and makes it the black reference data (S112). Here, the reference plate is provided at, for example, a position adjacent to the original document position.

Next, the CPU 18 turns on the illumination device 8 (S113). Next, the CPU 18 instructs the mechanical system drive circuit 21 to move the reading position to the position just below the reference plate, causes the one-dimensional image sensor device 5 to read the reference plate in the turning-on state, acquires read data for plural lines at known high reflectivity and makes it the white reference data (S114).

Next, the image reading apparatus performs an original document image reading processing to read an original document image (second reading object) (S115 to S116). Here, the CPU 18 instructs the mechanical system drive circuit 21 to move the read position to the original document position, causes the one-dimensional image sensor device 5 to read the original document image, and acquires read data (original document image read data) of the original document image, and the shading correction circuit 14 uses the reference data to perform the shading correction processing of the original document image read data, so that the correction data is acquired (S115).

Here, the CPU 18 instructs the mechanical system drive circuit 21 to move the first carriage 2 and the second carriage 3, and when the first carriage 2 reaches the leading edge (left edge in the drawing) of the original document, the CPU 18 performs sub-scanning, and successively outputs the output data outputted from the image processing circuit 16 to the external apparatus through the external interface circuit 23. In the sub-scanning, the first carriage 2 and the second carriage 3 move from the left to the right at speeds of (speed of the first carriage 2):(speed of the second carriage 3)=2:1 so that the light path length always becomes constant.

Thereafter, the sub-scanning is continued, and when it reaches the trailing edge of the original document corresponding to the original document size in the setting information, the CPU 18 stops the output of the output data to the external apparatus, sends an instruction to reverse the moving direction of the first carriage 2 and the second carriage 3 to the mechanical system drive circuit 21, and sends an instruction to turn off the illumination device 8 to the illumination device control circuit 22. Here, in the case where the carriage drive motor is a pulse motor such as a stepping motor, the original document size is managed by the number of pulses, and the amount of movement is controlled.

When it is detected by a not-shown optical position sensor that the first carriage 2 and the second carriage 3 moving in the opposite direction to the sub-scanning reach the initial position, an instruction to stop the first carriage 2 and the second carriage 3 is sent to the mechanical system drive circuit 21, the read position is returned to the initial position (S116), and this flow is ended. In the case where the image reading start instruction is inputted in the control panel 19 during the image reading processing, the foregoing image reading processing is again executed after the image reading processing.

Next, the shading correction circuit 14 will be described.

FIG. 17 is a block diagram showing an example of a structure of the related art shading correction circuit. The shading correction circuit 14 includes a selector 141, an averaging circuit 142, a memory selector 143, a black reference storage memory 144, a white reference storage memory 145, and a shading correction arithmetic circuit 146.

In the foregoing processing S112, the selector 141 selects an output destination in accordance with the instruction from the CPU 18, and outputs the read data acquired by the one-dimensional image sensor device 5 to the averaging circuit 142. In order to reduce the influence of random noise, the averaging circuit 142 performs an averaging processing of output of the one-dimensional image sensor device 5 for plural lines. The memory selector 143 selects an output destination in accordance with the instruction from the CPU 18, and stores the black reference data subjected to the averaging processing into the black reference storage memory 144.

In the foregoing processing S114, similarly to the black reference data, the white reference data is subjected to the averaging processing by the averaging circuit 142. The memory selector 143 selects an output destination in accordance with the instruction from the CPU 18, and stores the white reference data subjected to the averaging processing into the white reference storage memory 145.

In the foregoing processing S115, the selector 141 selects an output destination in accordance with the instruction from the CPU 18, and outputs the original document read data as the read data of the original document image acquired by the one-dimensional image sensor device 5 to the shading correction arithmetic circuit 146. The shading correction arithmetic circuit 146 performs a processing to normalize (original document read data black reference data) by (white reference data-black reference data) with respect to each pixel in the main scanning direction. For example, in the case where correction data after the shading correction processing has a resolution of 8 bits, correction data IMG_SHD(n) of the nth pixel in the main scanning direction after the shading correction processing is expressed by a following expression.

$$IMG\_SHD(n)=255\times(IMG(n)-\text{ref\_Black}(n))/(\text{ref\_White}(n)-\text{ref\_Black}(n)).$$

Here, IMG(n) denotes the original document read data of the nth pixel in the main scanning direction, ref_Black(n) denotes the black reference data of the nth pixel in the main scanning direction, and ref_White(n) denotes the white reference data of the nth pixel in the main scanning direction.

FIG. 18 is a graph showing an effect of the related art shading correction processing. The horizontal axis indicates the pixel number in the main scanning direction, and the vertical axis indicates the luminance. The data indicates the original document read data before the shading correction processing, and the correction data after the shading correction processing. In the original document image, the region of the image number 5000 to 5800 has a high density, and the other region has a low density. According to this drawing, it is understood that as compared with the original document read data before the shading correction processing, in the correction data after the shading correction processing, the sensitivity variation between each pixel in the main scanning direction in the one-dimensional image sensor device 5, and the uneven illumination of the illumination apparatus 8 are corrected.

Incidentally, as a related art technique relevant to the invention, there is an image reading apparatus in which plural light receiving element arrays are arranged in the sub-scanning direction, and the respective light receiving element arrays perform reading at different timings, so that the resolution in the sub-scanning direction is improved (see, for example, patent document 1).

However, in the case where the image reading apparatus includes plural light receiving element arrays as in the patent document 1, read data outputted from a specific light receiving element array is added with noise due to the influence of operation of another light receiving element array. Hereinafter, this noise is called cross-talk noise.

Patent document 1
JP-A-2004-289289

SUMMARY OF THE INVENTION

It is an object of an embodiment of the invention to provide an image reading apparatus in which cross-talk noise occurring between plural reading units is reduced, an image reading method and an image reading program.

In order to solve the foregoing problem, according to an aspect of the invention, there are included plural reading units configured to read a read object, output a result of reading as read data, and respectively operate at different timings, a reference data generation unit configured to acquire first read data as a result of reading of a first read object as the read object by the plural reading units, acquire an operation state of the plural reading units during the reading of the first reading object, generate reference data based on the first read data, associate the operation state with the reference data obtained in the operation state and store them, and a correction unit configured to acquire second read data as a result of reading of a second read object as the read object different from the first read object by the plural reading units, acquire an operation state of the plural reading units during the reading of the second reading object, acquire the reference data corresponding to the operation state, and correct the second read data based on the reference data.

Besides, according to another aspect of the invention, there are executed a first reading step of operating, at different timings, plural reading units that read a read object and output read data, acquiring first read data as a result of reading of a first read object as the read object by the plural reading units, and acquiring an operation state of the plural reading units during the reading of the first reading object, a reference data generation step of generating reference data based on the first read data, associating the operation state with the reference data obtained in the operation state and storing them, a second reading step of operating the plural reading units at different timings, acquiring second read data as a result of reading of a second read object as the read object different from the first read object by the plural reading units, and acquiring an operation state of the plural reading units during the reading of the second reading object, and a correction step of acquiring the reference data corresponding to the operation state acquired at the second reading step, and correcting the second read data based on the reference data.

Besides, according to another aspect of the invention, a computer is caused to execute a first reading step of operating, at different timings, plural reading units that read a read object and output read data, acquiring first read data as a result of reading of a first read object as the read object by the plural reading units, and acquiring an operation state of the plural reading units during the reading of the first reading object, a reference data generation step of generating reference data based on the first read data, associating the operation state with the reference data obtained in the operation state and storing them, a second reading step of operating the plural reading units at different timings, acquiring second read data as a result of reading of a second read object as the read object different from the first read object by the plural reading units, and acquiring an operation state of the plural reading units during the reading of the second reading object, and a correction step of acquiring the reference data corresponding to the operation state acquired at the second reading step, and correcting the second read data based on the reference data.

DESCRIPTION OF THE DRAWINGS

FIG. 5 is a view showing an example of an original document image and an image of a serial signal.

FIG. 6 is a view showing an example of related art white reference data and black reference data.

FIG. 7 is a view showing an example of an image before a related art shading correction processing and an image after the related art shading correction processing.

FIG. 10 is a flowchart showing an example of a white reference data acquisition processing of the embodiment.

FIG. 11 is a flowchart showing an example of an original document image reading processing of the embodiment.

FIG. 13 is a view showing an example of an image after the shading correction processing of the embodiment.

DESCRIPTION OF THE EMBODIMENTS

Hereinafter, embodiments of the invention will be described with reference to the drawings.

Figure 1:
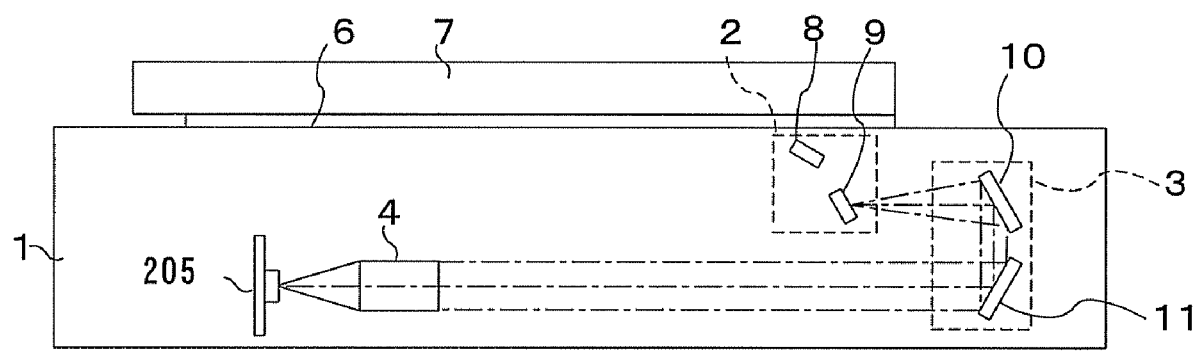
FIG. 1 is a block diagram showing an example of a structure of a mechanical system of an image reading apparatus of an embodiment.
Figure 14:
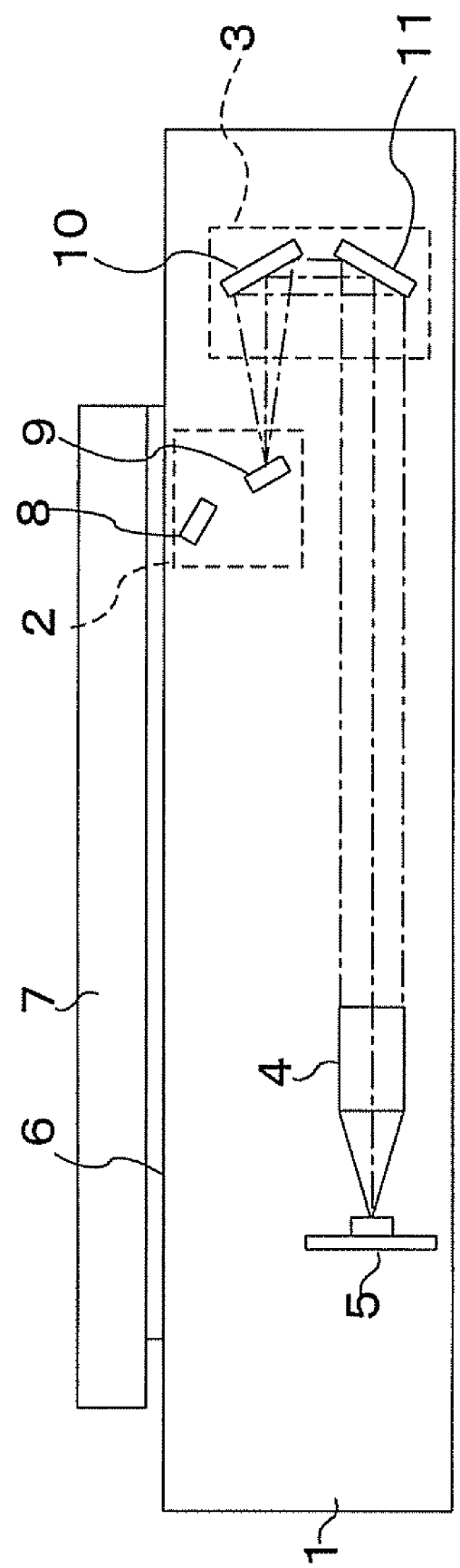
FIG. 14 is a block diagram showing an example of a structure of a mechanical system of a related art image reading apparatus.

FIG. 1 is a block diagram showing an example of a structure of a mechanical system of an image reading apparatus of an embodiment. In this drawing, the same reference numeral as that of FIG. 14 denotes the same or equivalent part to that shown in FIG. 14 and its explanation will be omitted here. In this drawing, as compared with FIG. 14, a one-dimensional image sensor device 205 is provided instead of the one-dimensional image sensor device 5.

Figure 2:
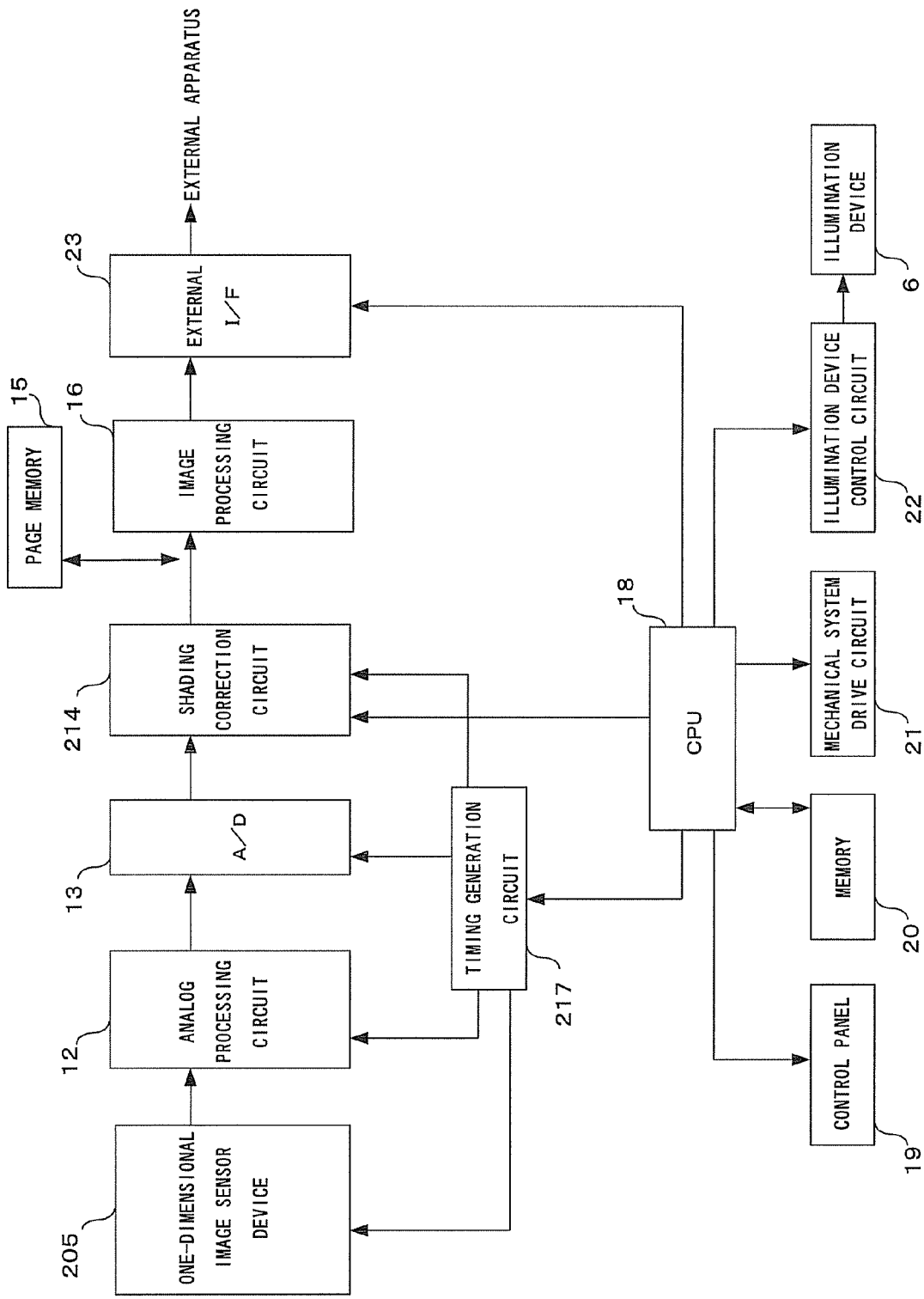
FIG. 2 is a block diagram showing an example of a structure of an electrical system of the image reading apparatus of the embodiment.
Figure 15:
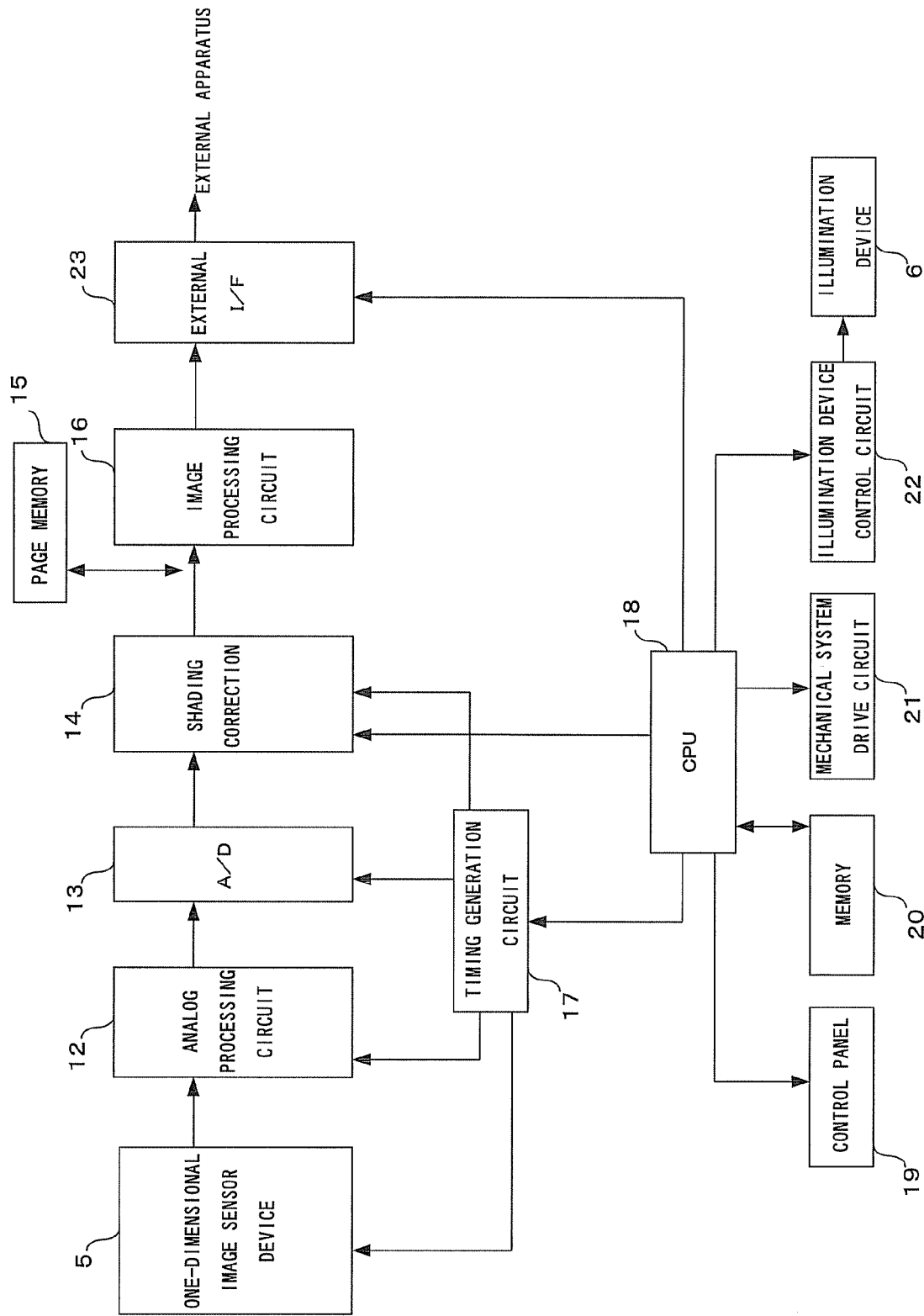
FIG. 15 is a block diagram showing an example of a structure of an electrical system of the related art image reading apparatus.
Figure 16:
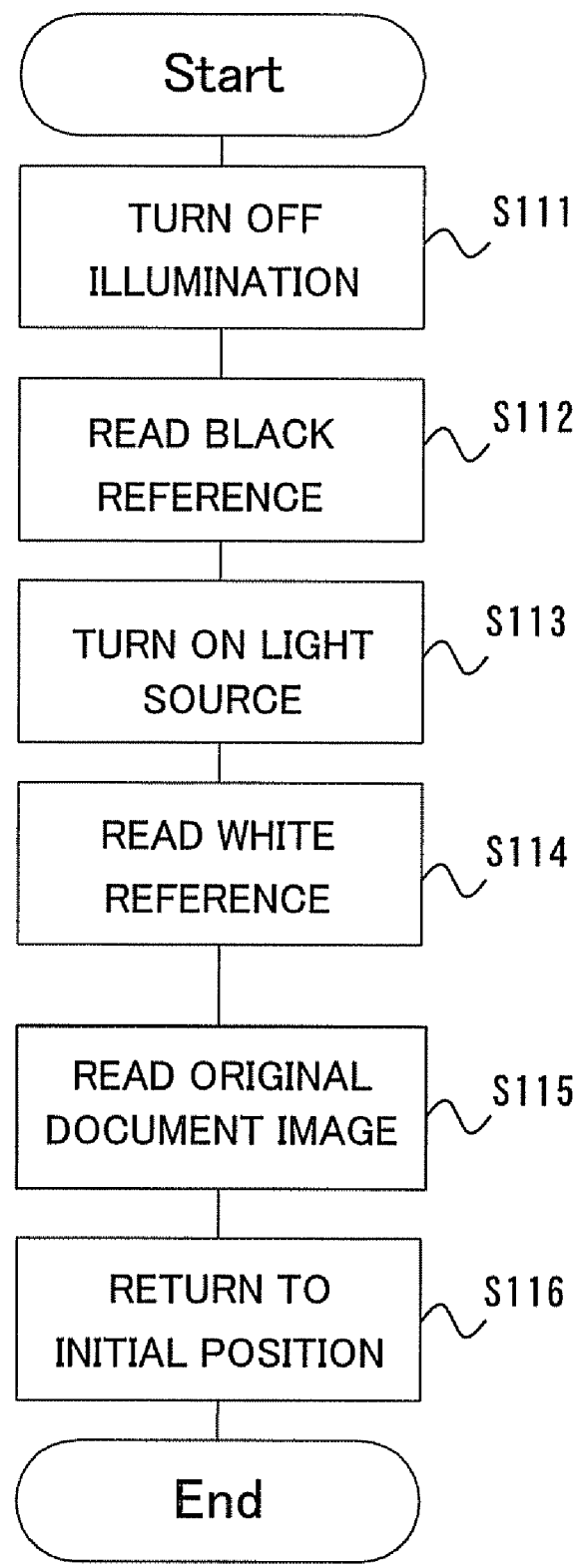
FIG. 16 is a flowchart showing an example of an operation of a related art image reading processing.
Figure 17:
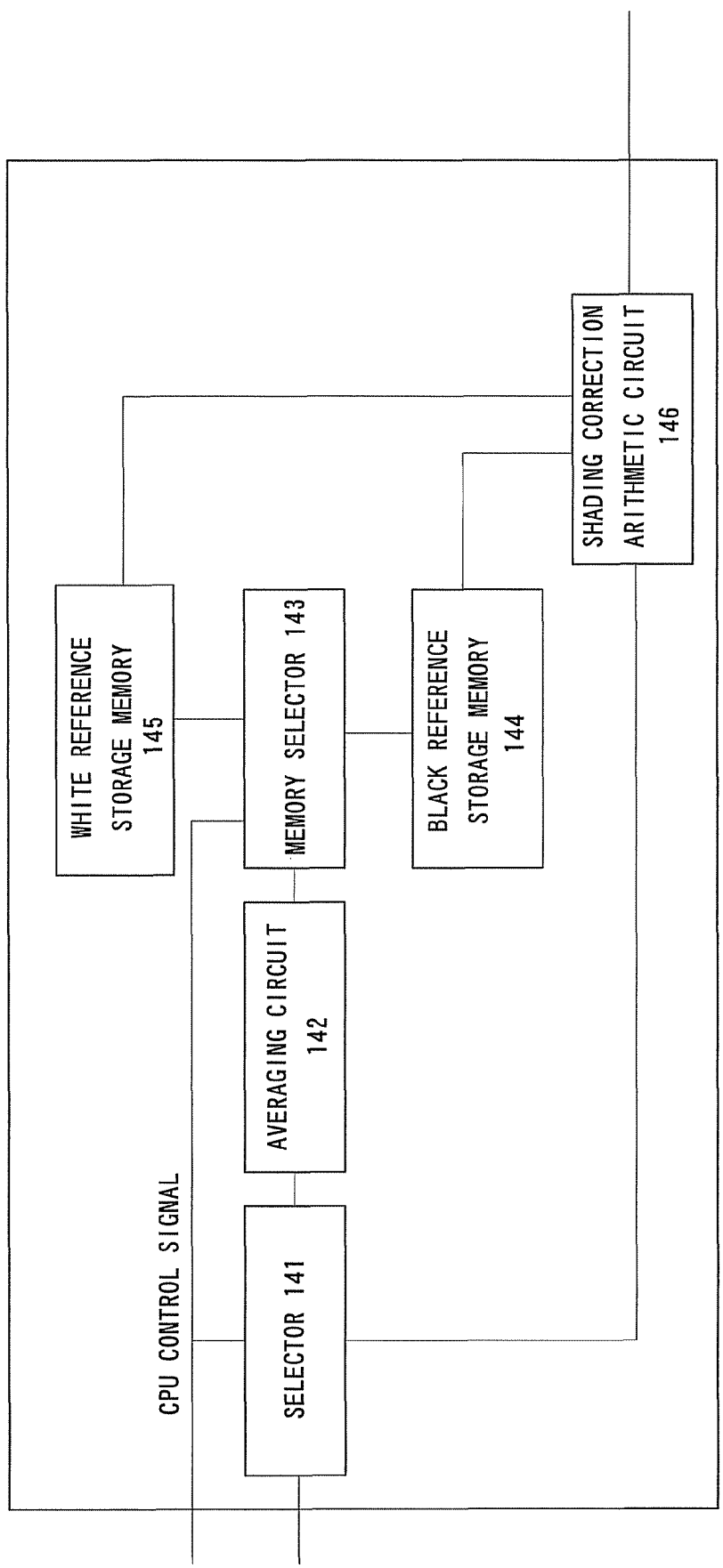
FIG. 17 is a block diagram showing an example of a structure of a related art shading correction circuit.
Figure 18:
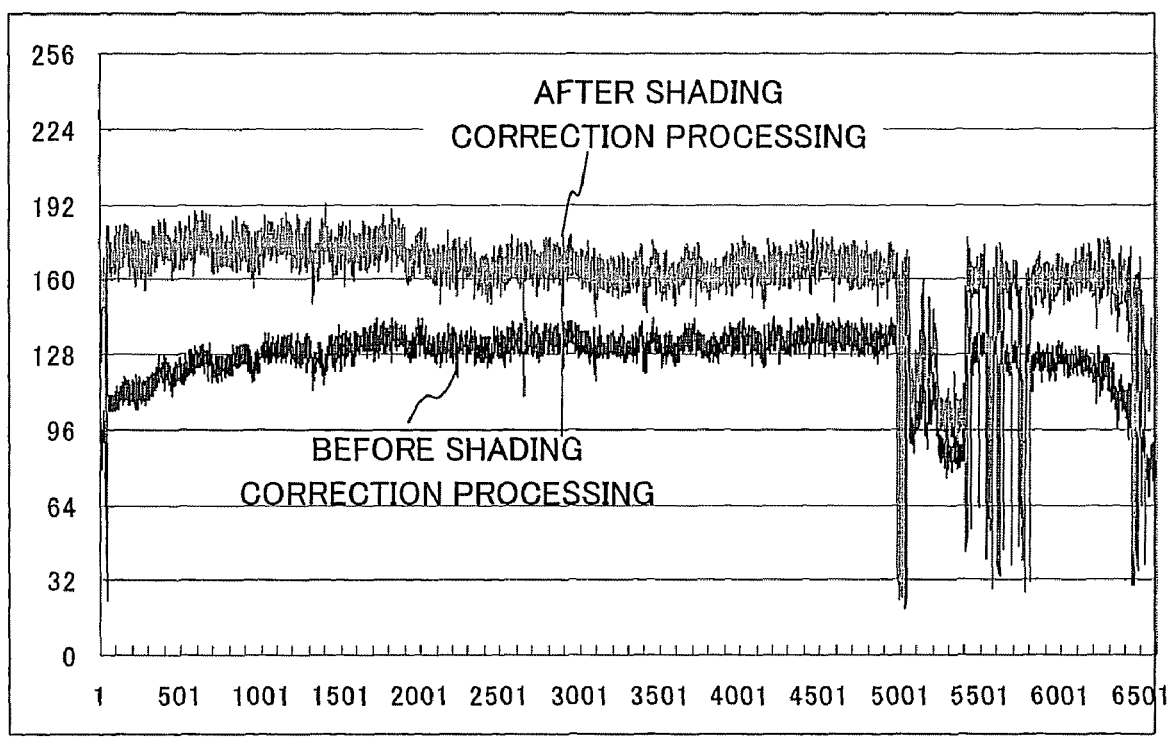
FIG. 18 is a graph showing an effect of a related art shading correction processing.

FIG. 2 is a block diagram showing an example of a structure of an electrical system of the image reading apparatus of the embodiment. In this drawing, the same reference numeral as that of FIG. 15 denotes the same or equivalent part to that shown in FIG. 15 and its explanation will be omitted here. In this drawing, as compared with FIG. 15, the one-dimensional image sensor device 205 is provided instead of the one-dimensional image sensor device 5, a shading correction circuit 214 is provided instead of the shading correction circuit 14, and a timing generation circuit 217 is provided instead of the timing generation circuit 17.

A CPU 18 has a role to perform various processings in the image reading apparatus, and has a role to perform various functions by executing programs stored in a memory 20. The memory 20 includes, for example, a ROM, a RAM or the like, and has a role to store various information and programs used in the image reading apparatus.

Next, the one-dimensional image sensor device 205 will be described.

Figure 3:
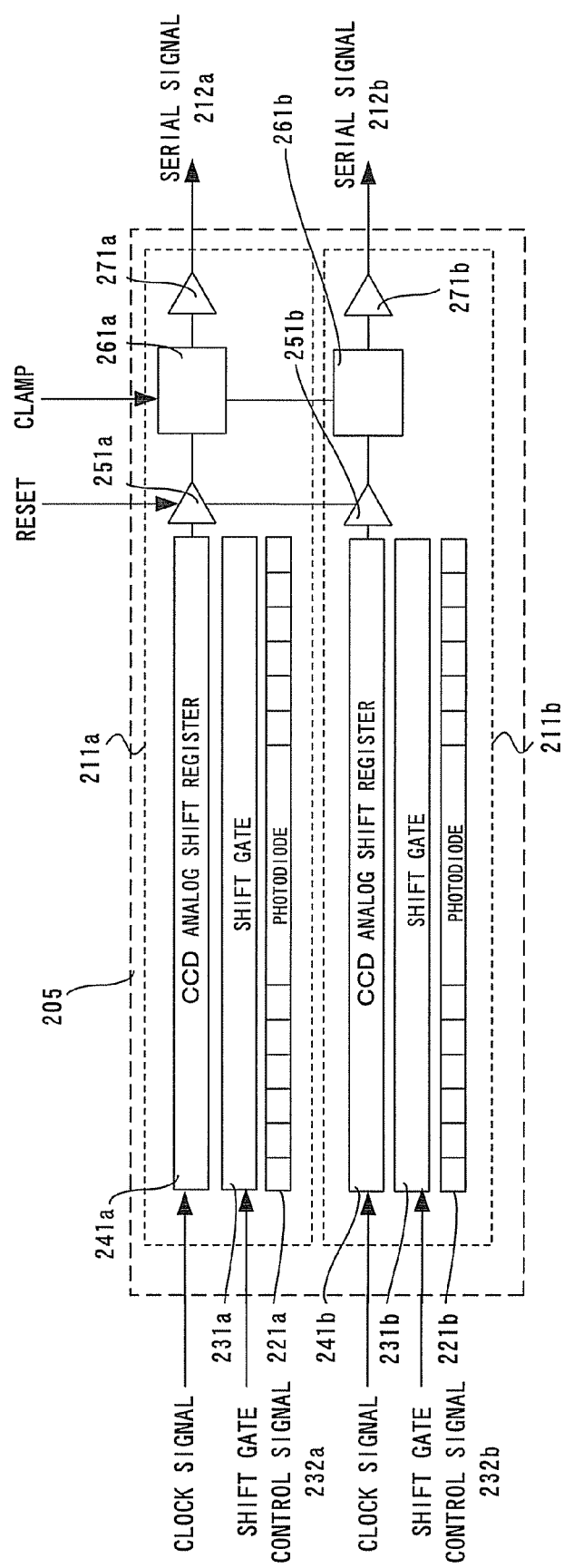
FIG. 3 is a block diagram showing an example of a structure of a one-dimensional image sensor device of the embodiment.

FIG. 3 is a block diagram showing an example of a structure of the one-dimensional image sensor device of the embodiment. The one-dimensional image sensor device 205 includes two-system sensor circuits 211a and 211b. The sensor circuit 211a includes a light receiving element (photodiode) array 221a, a shift gate 231a, a CCD (Charge Coupled Devices) analog shift register 241a, a reset gate 251a, a clamp circuit 261a, and an amplifier 271a. Similarly, the sensor circuit 211b includes a light receiving element array 221b, a shift gate 231b, a CCD analog shift register 241b, a reset gate 251b, a clamp circuit 261b, and an amplifier 271b.

Incidentally, for speeding up, the one-dimensional image sensor device 205 may be made to have such a structure that the stored electric charge of an even-number light receiving element and the stored electric charge of an odd-number light receiving element are respectively processed by different systems each including a shift gate, a CCD analog shift register, a reset gate, and a clamp circuit.

The light receiving element array 221a, 221b is such that a specified number of light receiving elements (photodiodes) are arranged on a straight line in the main scanning direction. Each of the light receiving elements stores an electric charge corresponding to the amount of received light, that is, performs the so-called photoelectric conversion, and the light reception areas of the light receiving elements are all equal to each other. When the shift gate 231a, 231b is brought into an open state in accordance with a shift gate control signal 232a, 232b at specified intervals given by the timing generation circuit 217, the stored electric charge of the light receiving element array 221a, 221b passes through the shift gate 231a, 231b and is shifted to the CCD analog shift register 241a, 241b.

The CCD analog shift register 241a, 241b outputs the shifted stored electric charge as a serial signal (one-dimensional image signal) to the reset gate 251a, 251b in accordance with a clock signal given by the timing generation circuit 217. The reset gate 251a, 251b is reset after a signal of a light receiving element has passed, and then, allows a signal of a next light receiving element to pass through, so that an influence is not exerted on the signal of the next light receiving element. The serial signal having passed through the reset gate 251a, 251b is clamped by the clamp circuit 261a, 261b, is amplified by the amplifier 271a, 271b, and is outputted as a serial signal 212a, 212b to an analog processing circuit 12.

Figure 4:
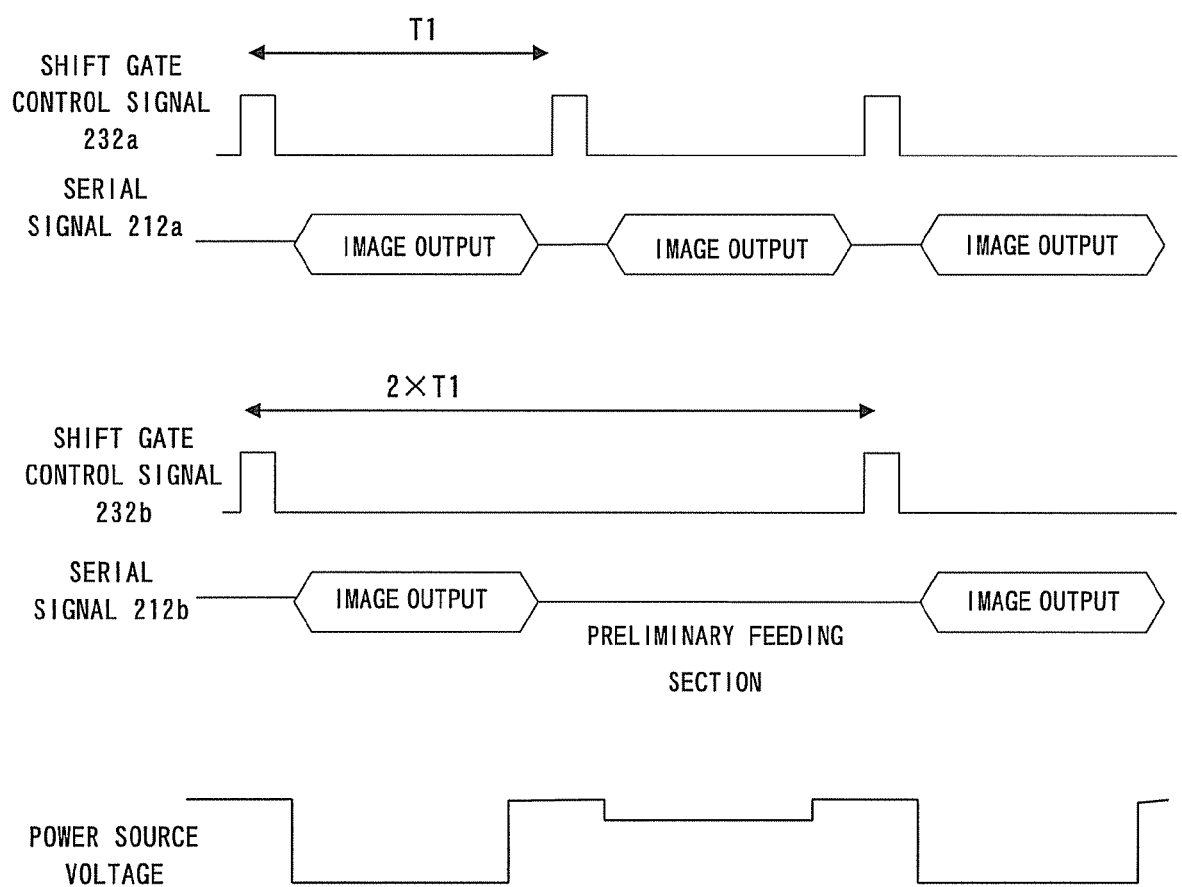
FIG. 4 is a timing chart showing an example of an operation state of the one-dimensional image sensor device of the embodiment.

FIG. 4 is a timing chart showing an example of an operation state of the one-dimensional image sensor device of the embodiment. This drawing shows, from above, waveforms of the shift gate control signal 232a, the serial signal 212a, the shift gate control signal 232b, the serial signal 212b, and power source voltage. The sensor circuit 211a outputs the serial signal 212a at a period T1 by the shift gate control signal 232a from the timing generation circuit 217. The sensor circuit 211b outputs the serial signal 212b at a period (2×T1) by the shift gate control signal 232b from the timing generation circuit 217. Accordingly, there occurs a case where the sensor circuits 211a and 211b simultaneously output the serial signals, and a state (preliminary feeding state) in which only the sensor circuit 211a outputs the serial signal and the sensor circuit 211b does not output the serial signal. Besides, since the light storage time of the sensor circuit 211b is twice the storage time of the sensor circuit 211a, the output level of the sensor circuit 211b is about twice the output level of the sensor circuit 211a.

Besides, in the case where the sensor circuit 221a, 221b operates and the serial signal 212a, 212b is outputted, there occurs a voltage drop of power supplied to the one-dimensional image sensor device 205. In the case where the invention is not applied, as the voltage drop becomes large, the level of the serial signal is lowered, and the dynamic range is lowered. Besides, a large voltage drop occurs in the case where both the sensor circuits 221a and 221b operate as compared with the case where one of the sensor circuits 221a and 221b operates. Besides, the voltage drop is proportional to the luminance of the original document image. In this embodiment, the level variation of the serial signal due to the voltage drop of the power is called cross-talk noise.

FIG. 5 is a view showing an example of an original document image and an image of a serial signal. The upper part of this drawing shows, from left, the original document image, an image A as an image of the serial signal 212a read from the original document image, and an image B as an image of the serial signal 212b read from the original document image. In all the images, the horizontal direction corresponds to the main scanning direction, and the vertical direction corresponds to the sub-scanning direction. Besides, the lower part of this drawing shows, from left, a profile of the original document image in the sub-scanning direction, a profile of the image A in the sub-scanning direction, and a profile of the image B in the sub-scanning direction. The profiles in the sub-scanning direction respectively correspond to the upper images, and indicate the luminance of one line of the upper image in the sub-scanning direction (vertical direction). In all the profiles, the horizontal axis indicates the pixel number in the sub-scanning direction, and the vertical axis indicates the luminance.

In the image A of this drawing, a stripe not existing in the original document image is seen in a high luminance region. Correspondingly to this, in the profile of the image A in the sub-scanning direction, variation (portion surrounded by a dotted line) of luminance is seen in the high luminance region. The stripe and the variation of luminance are the cross-talk noise, and it is understood that even if the original document image is uniform, the variation occurs by the output state of the serial signal 212a, 212b. Besides, since the resolution of the sensor circuit 211b in the sub-scanning direction is half of that of the sensor circuit 211a, the image reproducibility is inferior to the sensor circuit 211a, however, there is no influence of the cross-talk noise.

Next, a comparison is made between the case where the related art shading correction processing is performed on the one-dimensional image sensor device 205 and the case where the shading correction processing of the embodiment is performed on the one-dimensional image sensor device 205 and a description will be made.

First, a description will be given to the case where the related art shading correction processing is performed.

First, by the related art shading correction preparation processing, white reference data and black reference data are acquired from the serial signal 212*a*. FIG. 6 is a view showing an example of the related art white reference data and black reference data. The upper left of this drawing shows an image of the white reference data of the sensor circuit 211*a*, and the lower left shows a profile thereof in the sub-scanning direction. Besides, the upper right of the drawing shows an image of the black reference data of the sensor circuit 211*a*, and the lower right shows a profile thereof in the sub-scanning direction. In the acquisition of the white reference data and the black reference data, the serial signal 212*a* is averaged, so that an average value of pixels influenced by the cross-talk noise and pixels not influenced is stored as the white reference data and the black reference data into the memory.

FIG. 7 is a view showing an example of an image before the related art shading correction processing and an image after the related art shading correction processing. The upper left of the drawing shows the image before the shading correction processing, and the lower left shows a profile thereof in the sub-scanning direction. Besides, the upper right of this drawing shows the image of the black reference data after the shading correction processing, and the lower right shows a profile thereof in the sub-scanning direction. Thus, the cross-talk noise remains even after the shading correction processing. The image after the shading correction processing and the profile in the sub-scanning direction include the cross-talk noise, and image degradation occurs in the related art shading correction processing.

Next, a description will be given to the case where the shading correction processing of the embodiment is performed.

Figure 8:
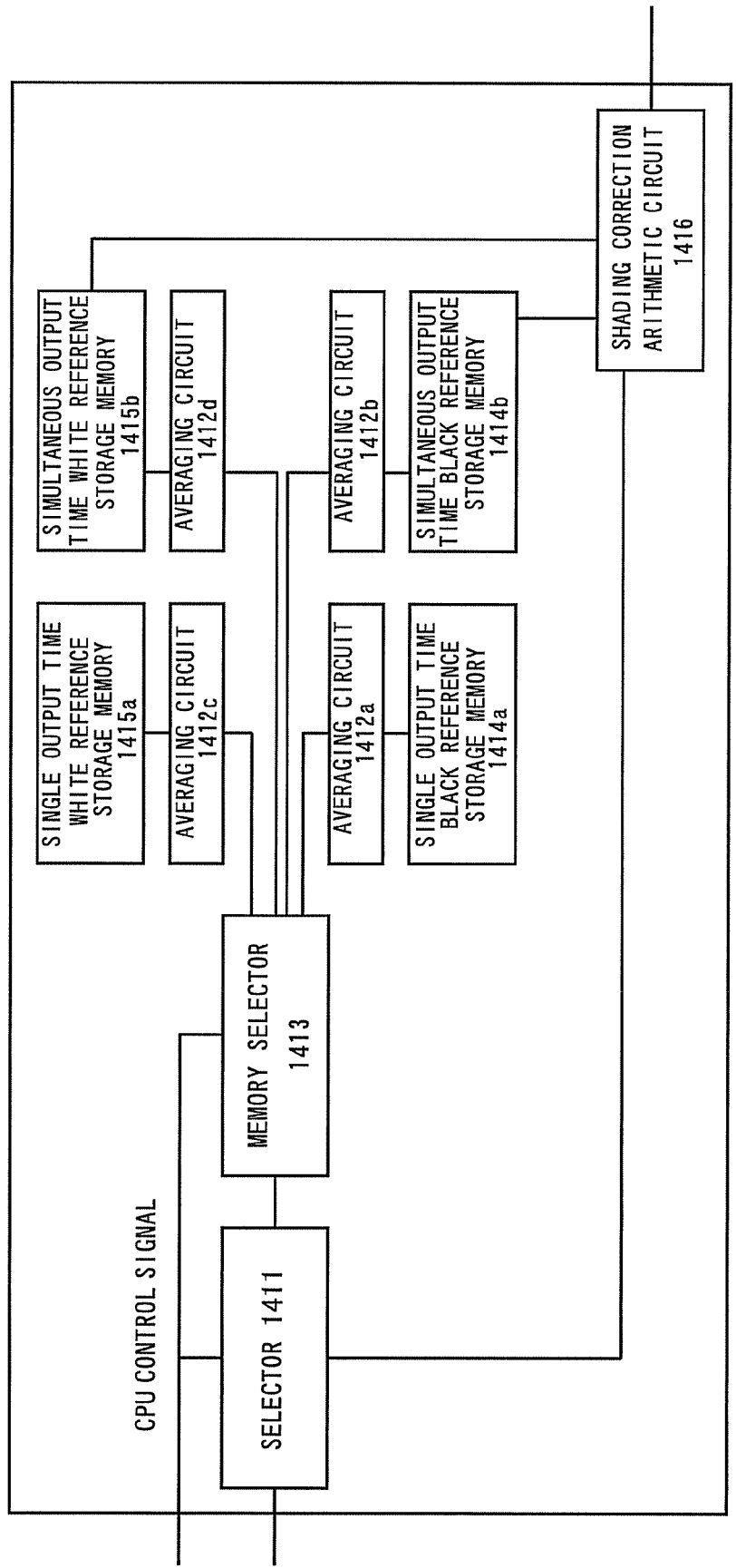
FIG. 8 is a block diagram showing an example of a structure of a shading correction circuit of the embodiment.

In this embodiment, there is proposed the shading correction processing in which the cross-talk noise is removed and image degradation is prevented. First, a structure of a shading correction circuit will be described. FIG. 8 is a block diagram showing an example of the structure of the shading correction circuit of the embodiment. As compared with the shading correction circuit 14, the shading correction circuit 214 includes a selector 1411 instead of the selector 141, includes a memory selector 1413 and averaging circuits 1412*a*, 1412*b*, 1412*c* and 1412*d* instead of the averaging circuit 142 and the memory selector 143, includes a single output time black reference storage memory 1414*a* and a simultaneous output time black reference storage memory 1414*b* instead of the black reference storage memory 144, includes a single output time white reference storage memory 1414*a* and a simultaneous output time white reference storage memory 1414*b* instead of the white reference storage memory 145, and includes a shading correction arithmetic circuit 1416 instead of the shading correction arithmetic circuit 146.

Next, the image reading processing of the embodiment will be described. Although it has a similar flow to the related art image reading processing, operations of processing S112, S114 and S115 are different.

Figure 9:
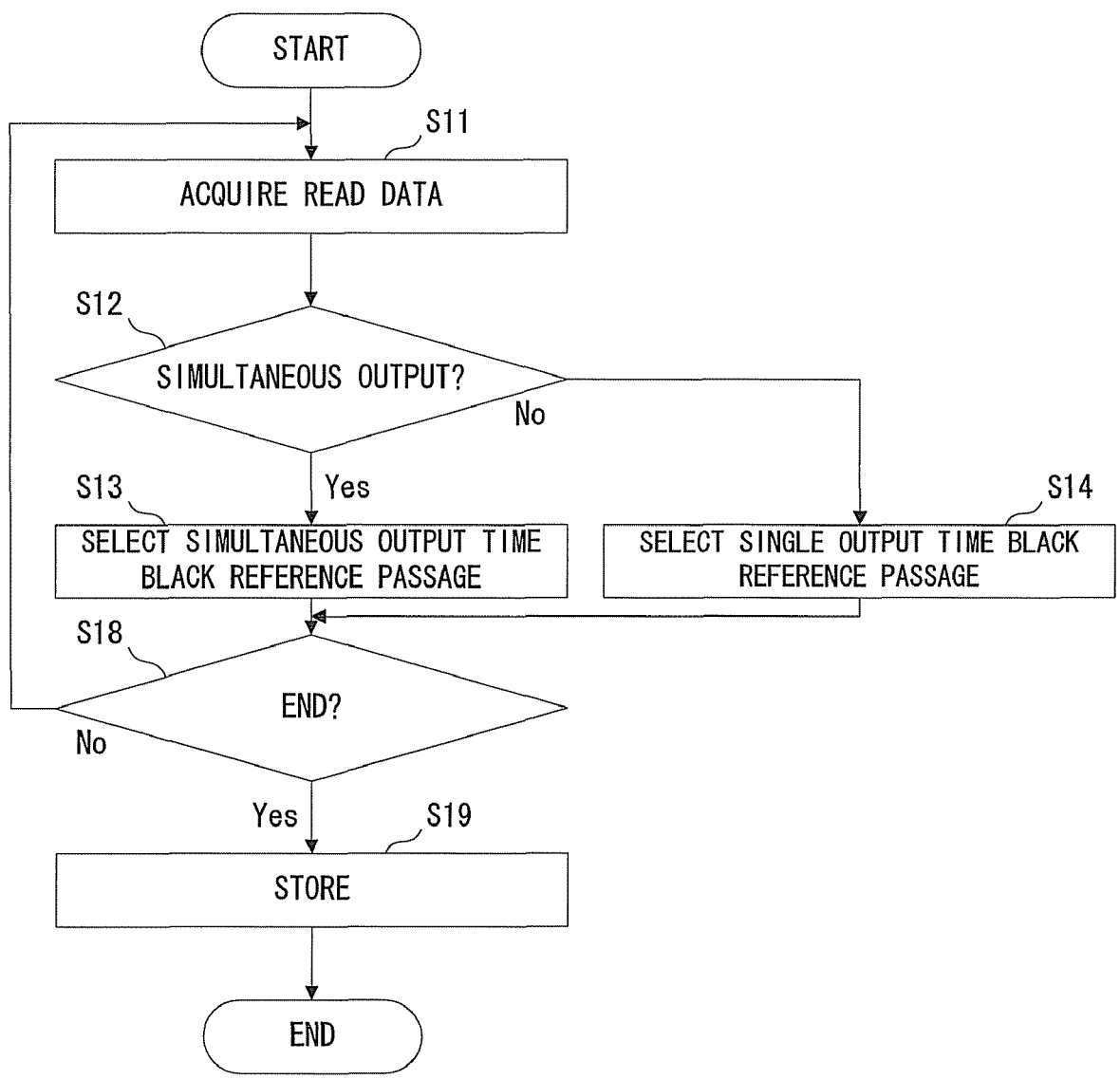
FIG. 9 is a flowchart showing an example of a black reference data acquisition processing of the embodiment.
Figure 1:
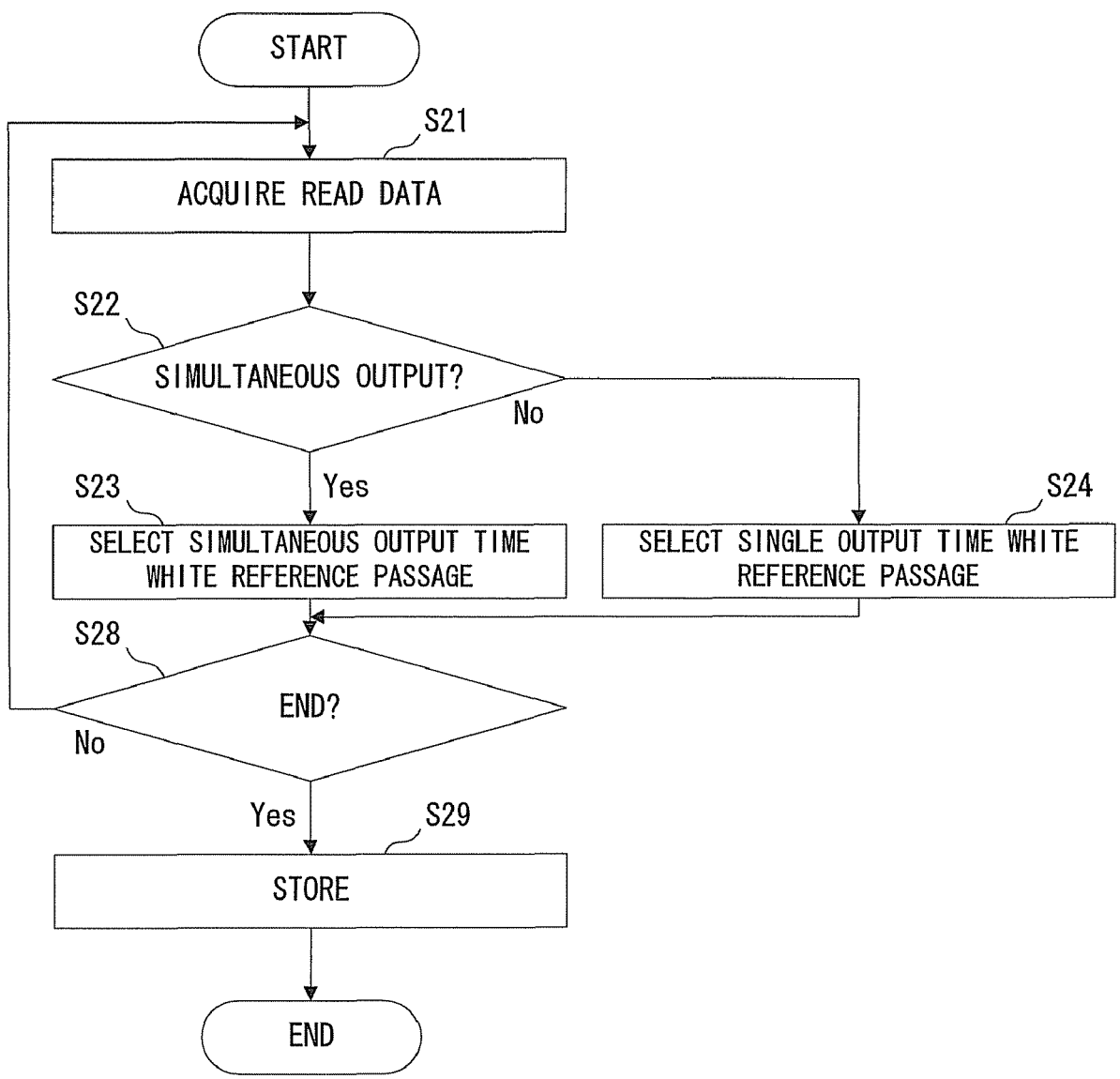
Figure 1:
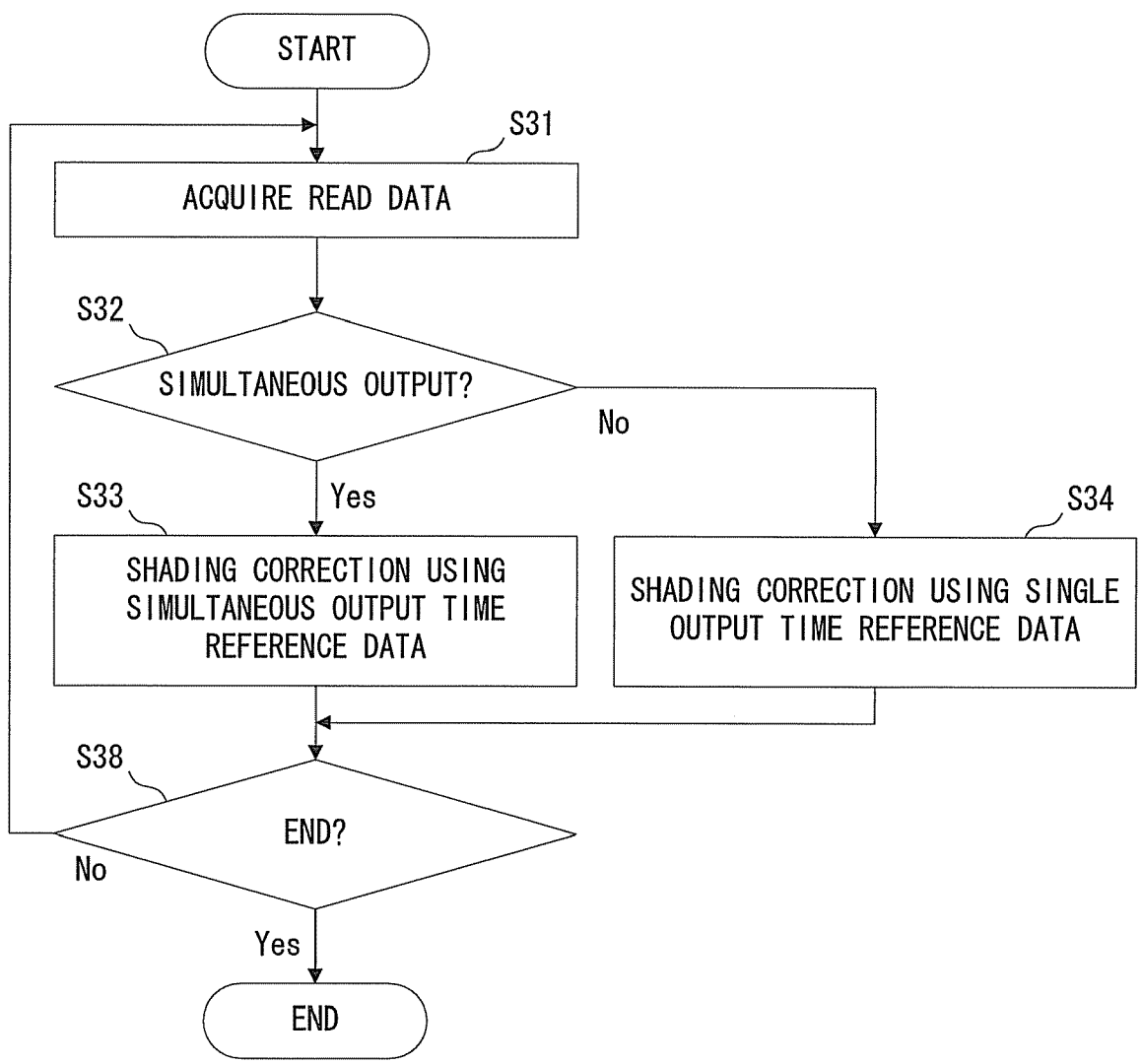

First, in this embodiment, instead of the related art processing S112, a black reference data acquisition processing is performed. FIG. 9 is a flowchart showing an example of the black reference data acquisition processing of the embodiment. First, similarly to the processing S112, the CPU 18 causes the one-dimensional image sensor device 205 to read a reference plate in the state where the illumination device 8 is turned off, and acquires read data for one line in the state where the reflectivity is close to zero (S11).

At this time, the CPU 18 causes the selector 1411 to select a passage to the memory selector 1413 by a CPU control signal, and the selector 1411 outputs the inputted serial signal (read data) to the memory selector 1413. Besides, the CPU 18 determines whether there occurs a case (simultaneous output time, first state) in which the serial signal outputted from the one-dimensional image sensor device 205 is simultaneously outputted from both the sensor circuits 211*a* and 211*b* or not (case (single output time, second state) in which it is outputted from only the sensor circuit 211*a*) (S12).

At the simultaneous output time (S12, Yes), the CPU 18 causes the memory selector 1413 to select a simultaneous output time black reference passage (passage to the averaging circuit 1412*b*) by the CPU control signal (S13), and at the single output time (S12, No), the CPU 18 causes the memory selector 1413 to select a single output time black reference passage (passage to the averaging circuit 1412*a*) by the CPU control signal (S14).

Next, the CPU 18 determines whether the processing of all lines is ended (S18). In the case where it is not ended (S18, No), return is made to processing S11, and processing of a next line is performed, and in the case where it is ended (S18, Yes), the averaging circuits 1412*a* and 1412*b* respectively store the results of averaging into the single output time black reference storage memory 1414*a* and the simultaneous output time black reference storage memory 1414*b* (S19), and this flow is ended.

Here, the averaging circuit 1412*b* performs averaging of each pixel in the main scanning direction for plural lines inputted from the memory selector 1413, and at the time point when this flow is ended, the averaged data for one line is stored as simultaneous output time black reference data (first black reference data) into the simultaneous output time black reference storage memory 1414*b*. Similarly, the averaging circuit 1412*a* performs averaging of each pixel in the main scanning direction for plural lines inputted from the memory selector 1413, and at the time point when this flow is ended, the averaged data for one line is stored as single output time black reference data (second black reference data) into the single output time black reference storage memory 1414*a*.

Besides, in this embodiment, white reference data acquisition is performed instead of the related art processing S114. FIG. 10 is a flowchart showing an example of the white reference data acquisition processing of the embodiment. First, similarly to processing S114, the CPU 18 causes the one-dimensional image sensor device 205 to read the reference plate in the state where the illumination device 8 is turned on, and read data in the state where the reflectivity is close to 1 is acquired for one line (S21).

At this time, the CPU 18 causes the selector 1411 to select the passage to the memory selector 1413 by the CPU control signal, and the selector 1411 outputs the inputted serial signal to the memory selector 1413. Besides, similarly to processing S12, the CPU 18 determines whether the simultaneous output time occurs or not (S22).

At the simultaneous output time (S22, Yes), the CPU 18 causes the memory selector 1413 to select a simultaneous output time white reference passage (passage to the averaging circuit 1412*d*) by the CPU control signal (S23), and at the single output time (S22, No), the CPU 18 causes the memory selector 1413 to select a single output time white reference passage (passage to the averaging circuit 1412*c*) by the CPU control signal (S24).

Next, the CPU 18 determines whether processing of all lines is ended (S28). In the case where it is not ended (S28, No), return is made to processing S21, and processing of a next line is performed, and in the case where it is ended (S28, Yes), the averaging circuits 1412c and 1412d respectively store results of the averaging into the single output time white reference storage memory 1415a and the simultaneous output time white reference storage memory 1415b (S29), and this flow is ended.

Here, the averaging circuit 1412d performs averaging of each pixel in the main scanning direction for plural lines inputted from the memory selector 1413, and at the time point when this flow is ended, the averaged data for one line is stored as simultaneous output time white reference data (first white reference data) into the simultaneous output time white reference storage memory 1415b. Similarly, the averaging circuit 1412c performs averaging of each pixel in the main scanning direction for plural lines inputted from the memory selector 1413, and at the time point when this flow is ended, the averaged data for one line is stored as single output time white reference data (second white reference data) into the single output time white reference storage memory 1415a.

Besides, in this embodiment, an original document image reading processing is performed instead of the related art processing S115. FIG. 11 is a flowchart showing an example of a correction data processing of the embodiment. First, similarly to processing S115, the CPU 18 causes the one-dimensional image sensor device 205 to read the original document image, and the original document image data as read data is acquired for one line (S31).

At this time, the CPU 18 causes the selector 1411 to select a passage to the shading correction arithmetic circuit 1416 by the CPU control signal, and the selector 1411 outputs the inputted serial signal to the shading correction arithmetic circuit 1416. Besides, similarly to processing S12, the shading correction arithmetic circuit 1416 determines whether the simultaneous output time occurs or not (S32).

At the simultaneous output time (S32, Yes), the shading correction arithmetic circuit 1416 uses the simultaneous output time reference data to perform the shading correction processing of the original document read data (S33). At the single output time (S32, No), the shading correction arithmetic circuit 1416 uses the single output time reference data to perform the shading correction processing of the original document read data (S34).

Here, the simultaneous output time reference data is such reference data that the simultaneous output time black reference data stored in the simultaneous output time black reference storage memory 1414b is black reference data, and the simultaneous output time white reference data stored in the simultaneous output time white reference storage memory 1415b is white reference data. The single output time reference data is such reference data that the single output time black reference data stored in the single output time black reference storage memory 1414a is black reference data, and the single output time white reference data stored in the single output time white reference storage memory 1415a is white reference data.

Next, the shading correction arithmetic circuit 1416 outputs, as correction data, data for one line which is the result of the shading correction processing.

Next, the CPU 18 determines whether processing of all lines is ended (S38). In the case where it is not ended (S38, No), return is made to processing S21, and processing of a next line is performed, and in the case where it is ended (S38, Yes), this flow is ended.

By the foregoing correction data processing, the shading correction arithmetic circuit 1416 selects the reference data corresponding to the presence or absence of the cross-talk noise for each line of the original document read data, and can perform the shading correction.

Next, the details of the reference data will be described.

Figure 12:
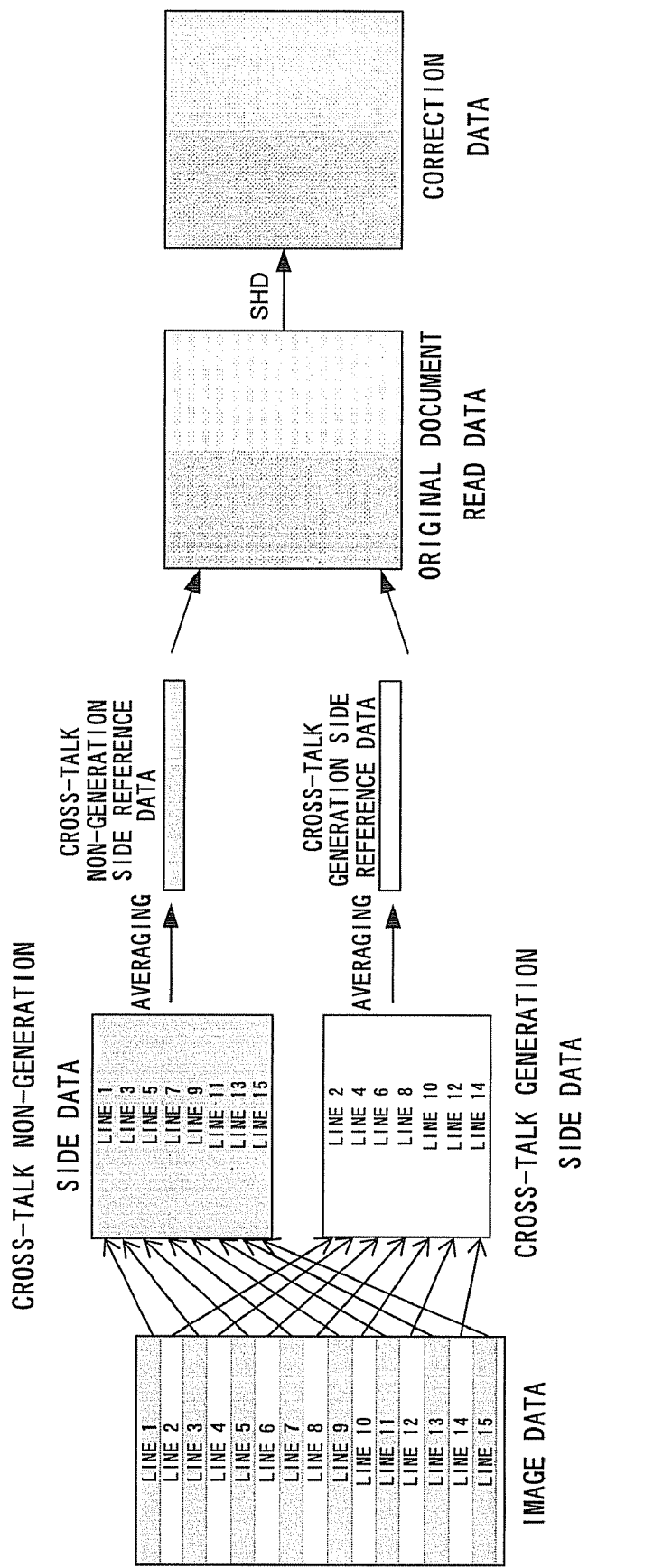
FIG. 12 is a conceptual view showing an example of data in a shading correction preparation processing and a shading correction processing of the embodiment.

FIG. 12 is a conceptual view showing an example of data in the shading correction preparation processing and the shading correction processing of the embodiment. In the shading correction preparation processing, the read data for black reference or read data for white reference are read for 15 lines by the one-dimensional image sensor device 205. The numbers from line 1 to line 15 are attached to these read data at each sub-scanning line.

In the black reference data acquisition processing, odd-number lines distributed by the memory selector 1413 among the read data are cross-talk non-generation side data (single output time reference data) not influenced by the cross-talk noise, are averaged at each pixel in the main scanning direction by the averaging circuit 1412a, and are stored as the cross-talk non-generation side reference data for one line into the single output time black reference storage memory 1414a.

Similarly, in the black reference data acquisition processing, even-number lines distributed by the memory selector 1413 among the read data are cross-talk generation side data (simultaneous output time reference data) influenced by the cross-talk noise, are averaged at each pixel in the main scanning direction by the averaging circuit 1412b, and are stored as the cross-talk generation side reference data for one line into the simultaneous output time black reference storage memory 1414b.

In the white reference data acquisition processing, the cross-talk non-generation side reference data for one line in which the odd-number lines are averaged is stored in the single output time white reference storage memory 1415a, and the cross-talk generation side reference data for one line in which the even-number lines are averaged is stored in the simultaneous output time white reference storage memory 1415b.

Next, the original document read data is acquired by the one-dimensional image sensor device 205. In this original document read data, dark and light stripes occur in the sub-scanning direction by the cross-talk noise. Next, the shading correction arithmetic circuit 1416 suitably selects data stored in the single output time black reference storage memory 1414a, the simultaneous output time black reference storage memory 1414b, the single output time white reference storage memory 1415a, and the simultaneous output time white reference storage memory 1415b, and performs the shading correction processing (SHD) on the original document read data to generate correction data. In this correction data, the influence of the cross-talk noise is removed.

FIG. 13 is a view showing an example of an image after the shading correction processing of the embodiment. The upper part of this drawing shows the image after the shading correction processing of the embodiment, and the lower part shows the profile thereof in the sub-scanning direction. In the image after the related art shading correction processing shown in FIG. 7 and the profile in the sub-scanning direction after the related art shading correction processing, the cross-talk noise occurs and the image degradation occurs, whereas in the image shown in FIG. 10 after the shading correction processing of the embodiment is performed, the cross-talk noise is removed and the image degradation is prevented.

Besides, the invention can be easily applied to an image forming apparatus having an image reading function.

Incidentally, the first reading unit corresponds to the sensor circuit 211a in the embodiment. The second reading unit corresponds to the sensor circuit 211b in the embodiment. The reference data generation unit corresponds to the selector

1411 and the averaging circuits 1412*a*, 1412*b*, 1412*c* and 1412*d* in the embodiment. The correction unit corresponds to the shading correction arithmetic circuit 1416.

Besides, the first reading step corresponds to processing S11, S21. The reference data generation step corresponds to processings S12 to S29, S12 to S29. The second reading step corresponds to processing S31. The correction step corresponds to processings S32 to S38.

The respective steps of the processing in the image reading apparatus are realized by causing the CPU 18 to execute an image reading program stored in the memory 20.

Although the description has been given to the case where the function to carry out the invention is previously recorded in the inside of the apparatus, no limitation is made to this, and the same function may be downloaded from a network to the apparatus, or the same function stored on a recording medium may be installed in the apparatus. The recording medium may have any mode as long as the recording medium, such as a CD-ROM, can store a program and can be read by the apparatus. Besides, the function obtained by the previous installation or download may realize the function in cooperation with the OS (Operating System) in the inside of the apparatus.

As described above in detail, according to the invention, it becomes possible to reduce the cross-talk noise which occurs in the case where plural light receiving element arrays operate at different timings, and it becomes possible to prevent image degradation.

What is claimed is:

1. An image reading apparatus comprising:
   a plurality of reading units configured to read a read object, output a result of reading as read data, and respectively operate at different timings;
   a reference data generation unit configured to acquire first read data as a result of reading of a first read object as the read object by the plurality of reading units, acquire an operation state of the plurality of reading units during the reading of the first reading object, generate reference data based on the first read data, associate the operation state with the reference data obtained in the operation state and store them; and
   a correction unit configured to acquire second read data as a result of reading of a second read object as the read object different from the first read object by the plurality of reading units, acquire an operation state of the plurality of reading units during the reading of the second reading object, acquire the reference data corresponding to the operation state, and correct the second read data based on the reference data, wherein
   the plurality of reading units include a first reading unit and a second reading unit,
   the operation state is one of a first state in which the first reading unit and the second reading unit simultaneously perform reading, and a second state in which only the first reading unit performs reading,
   the reference data includes first reference data generated based on the first read data in the first state, and second reference data generated based on the first read data in the second state, and
   the correction unit corrects the second read data in the first state based on the first reference data, and corrects the second read data in the second state based on the second reference data.

2. The image reading apparatus according to claim 1, wherein the operation state is information based on power consumption of the plurality of reading units.

3. The image reading apparatus according to claim 1, wherein the operation state indicates a combination as to whether each of the plurality of reading units performs reading.

4. The image reading apparatus according to claim 1, wherein the plurality of reading units respectively perform reading at different periods.

5. The image reading apparatus according to claim 1, wherein a reading period of the second reading unit is integer times as large as a reading period of the first reading unit.

6. The image reading apparatus according to claim 1, wherein
   each of the plurality of reading units includes light receiving elements arranged in a line, a direction of the line is a main scanning direction, the plurality of reading units are arranged in parallel to each other, and
   the reading unit performs reading on each line, and outputs the read data on each line.

7. The image reading apparatus according to claim 6, wherein the reference data generation unit acquires a plurality of lines of the first read data in the first state, averages the plurality of lines for each pixel in the main scanning direction to obtain the first reference data for one line, acquires a plurality of lines of the first read data in the second state, and averages the plurality of lines for each pixel in the main scanning direction to obtain the second reference data for one line.

8. The image reading apparatus according to claim 1, wherein
   the first reference data includes first black reference data as black reference data and first white reference data as white reference data,
   the second reference data includes second black reference data as black reference data and second white reference data as white reference data, and
   the correction unit performs a shading correction of the second read data in the first state based on the first reference data, and performs a shading correction of the second read data in the second state based on the second reference data.

9. The image reading apparatus according to claim 8, wherein the reference data generation unit acquires turning-off state data as the first read data in which the first read object is read in a state where illumination to the first read object is turned off, and turning-on state data as the first read data in which the first read object is read in a state where the illumination is turned on, generates the black reference data based on the turning-off state data, and generates the white reference data based on the turning-on state data.

10. An image reading method comprising:
    a first reading step of operating, at different timings, a plurality of reading units that read a read object and output read data, acquiring first read data as a result of reading of a first read object as the read object by the plurality of reading units, and acquiring an operation state of the plurality of reading units during the reading of the first reading object;
    a reference data generation step of generating reference data based on the first read data, associating the operation state with the reference data obtained in the operation state and storing them;
    a second reading step of operating the plurality of reading units at different timings, acquiring second read data as a result of reading of a second read object as the read object different from the first read object by the plurality of reading units, and acquiring an operation state of the plurality of reading units during the reading of the second reading object; and a correction step of acquiring the reference data corresponding to the operation state acquired at the second reading step, and correcting the second read data based on the reference data, wherein the plurality of reading units include a first reading unit and a second reading unit, the operation state is one of a first state in which the first reading unit and the second reading unit simultaneously perform reading, and a second state in which only the first reading unit performs reading, the reference data includes first reference data generated based on the first read data in the first state, and second reference data generated based on the first read data in the second state, and at the correction step, the second read data in the first state is corrected based on the first reference data, and the second read data in the second state is corrected based on the second reference data.

11. The image reading method according to claim 10, wherein the operation state is information based on power consumption of the plurality of reading units.

12. The image reading method according to claim 10, wherein the operation state indicates a combination as to whether each of the plurality of reading units performs reading.

13. The image reading method according to claim 10, wherein at the first reading step and the second reading step, the plurality of reading units are respectively made to perform reading at different periods.

14. An image reading program stored on a computer-readable medium causing a computer to execute:

a first reading step of operating, at different timings, a plurality of reading units that read a read object and output read data, acquiring first read data as a result of reading of a first read object as the read object by the plurality of reading units, and acquiring an operation state of the plurality of reading units during the reading of the first reading object;

a reference data generation step of generating reference data based on the first read data, associating the operation state with the reference data obtained in the operation state and storing them;

a second reading step of operating the plurality of reading units at different timings, acquiring second read data as a result of reading of a second read object as the read object different from the first read object by the plurality of reading units, and acquiring an operation state of the plurality of reading units during the reading of the second reading object; and a correction step of acquiring the reference data corresponding to the operation state acquired at the second reading step, and correcting the second read data based on the reference data, wherein the plurality of reading units include a first reading unit and a second reading unit, the operation state is one of a first state in which the first reading unit and the second reading unit simultaneously perform reading, and a second state in which only the first reading unit performs reading, the reference data includes first reference data generated based on the first read data in the first state, and second reference data generated based on the first read data in the second state, and at the correction step, the second read data in the first state is corrected based on the first reference data, and the second read data in the second state is corrected based on the second reference data.

15. The image reading program according to claim 14, wherein the operation state is information based on power consumption of the plurality of reading units.

16. The image reading program according to claim 14, wherein the operation state indicates a combination as to whether each of the plurality of reading units performs reading.

17. The image reading program according to claim 14, wherein at the first reading step and the second reading step, the plurality of reading units are respectively made to perform reading at different periods.

* * * * *